(12) United States Patent
Samad et al.

(10) Patent No.: US 10,048,890 B1
(45) Date of Patent: Aug. 14, 2018

(54) SYNCHRONIZING CATALOGS OF VIRTUAL MACHINE COPIES

(71) Applicant: EMC Corporation, Hopkinton, MA (US)

(72) Inventors: Mohammed Abdul Samad, Bangalore (IN); Shelesh Chopra, Bangalore (IN); Vladimir Mandic, San Jose, CA (US)

(73) Assignee: EMC CORPORATION, Hopkinton, MA (US)

( * ) Notice: Subject to any disclaimer, the term of this patent is extended or adjusted under 35 U.S.C. 154(b) by 20 days.

(21) Appl. No.: 15/200,222

(22) Filed: Jul. 1, 2016

(51) Int. Cl.
*G06F 3/06* (2006.01)

(52) U.S. Cl.
CPC .......... *G06F 3/065* (2013.01); *G06F 3/0619* (2013.01); *G06F 3/0664* (2013.01); *G06F 3/0683* (2013.01)

(58) Field of Classification Search
CPC .. G06F 12/00; G06F 11/1146; G06F 11/1148; G06F 11/1458; G06F 11/1161; G06F 11/1169; G06F 3/062
USPC ................. 711/100, 154, 162, 163
See application file for complete search history.

(56) References Cited

U.S. PATENT DOCUMENTS

| 2008/0115071 A1* | 5/2008 | Fair ..................... G06F 11/1451 715/764 |
| 2012/0078845 A1* | 3/2012 | Kasbekar ............. G06Q 10/107 707/640 |
| 2016/0077925 A1* | 3/2016 | Tekade ................ G06F 11/1456 707/654 |

* cited by examiner

*Primary Examiner* — Tuan Thai
(74) *Attorney, Agent, or Firm* — Dergosits & Noah LLP; Todd A. Noah (57) ABSTRACT

Synchronizing catalogs of virtual machine copies is described. A system determines the number of copies of a virtual machine in a catalog associated with a virtual machine storage management tool. The system determines the number of copies of the virtual machine in a catalog associated with a backup application. The system creates a copy of the virtual machine, which is associated with the backup application, if the number of copies of the virtual machine in the catalog associated with the virtual machine storage management tool is greater than zero and if the number of copies of the virtual machine in the catalog associated with the backup application is zero.

17 Claims, 4 Drawing Sheets

| Virtual Machine 204 | In VASA Catalog? 206 | In Avamar Catalog? 208 | Action 210 |
|---|---|---|---|
| VM_001 | Yes | Yes | None |
| VM_002 | No | Yes | Purge copy from Avamar Catalog |
| VM_003 | Yes | No | Add copy to Avamar Catalog |
| VM_004 | No | No | None |

212

| Virtual Machine 214 | Required # of Copies 216 | Current # of Copies 218 | Action 220 |
|---|---|---|---|
| VM_001 | 2 | 0 | Create 2 copies |
| VM_002 | 2 | 1 | Create 1 copy |
| VM_003 | 2 | 2 | None |
| VM_004 | 2 | 3 | Output excessive copies message |

222

| Role 224 | Access to primary copy? 226 |
|---|---|
| Disaster Recovery | Yes |
| Test Developer | No |
| Non-administrative User | No |
| Administrative User | Yes |
| Backup Application | No |
| Analytics Application | No |
| Validation Application | No |
| Mission Critical Application | Yes |

SYNCHRONIZING CATALOGS OF VIRTUAL MACHINE COPIES

BACKGROUND

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup/restore application to execute a restore operation to restore a copy of the corresponding backup files for that state to the data object. A backup/restore application may create a full backup file that includes all of a data object or the parts of the data object that are used. A backup/restore application may also create an incremental backup file that includes only changes made to the data object since a selected time, such as a previous backup of the data object.

An image, such as a snapshot, is a capture of a state of a data object, such as a file system, a virtual machine, or an application, at a specific moment in time. A data object may be stored on a storage array, which is a disk storage system that includes multiple disk drives. Unlike a disk enclosure, a storage array has cache memory and advanced functionality, such as virtualization and Redundant Array of Independent Disks (RAID). A data protection administrator may manage a backup/restore application to create images of data objects and store the images of data objects on multiple storage arrays.

A virtual machine is a software implementation of a computer that executes programs like a physical machine. A system virtual machine provides a complete system platform which supports the execution of a complete operating system, and usually emulates an existing architecture, including disks. Multiple instances of virtual machines lead to more efficient use of computing resources, both in terms of energy consumption and cost effectiveness, known as hardware virtualization, the key to a cloud computing environment. Similar to other data objects, backup copies may be made of virtual machine data objects to enable a restoration of the virtual machine data objects in the event of corruption or an erroneous update to the virtual machine data objects.

Server virtualization has proven to be a highly effective technology in many enterprises, and is a key element enabling cloud and information technology as a service offerings. Storage technology has been an area of increased focus as server virtualization has expanded, due to the impact server virtualization has on data access patterns of applications. Some enterprises have consolidated information technology roles and responsibilities, as utilizing information technology generalists, such as hypervisor-centric information technology administrators, may be more efficient. Virtual machine management tools are expanding to encompass more of the information technology infrastructure to improve the efficiency and effectiveness of information technology generalists.

An example of a virtual machine management tool is VASA (vSphere APIs for Storage Awareness), which is a virtual machine storage management tool that is available from VMware® and that enables Virtual Volumes (VVOLs), which is an integration and management framework for external storage such as storage area networks (SAN) and network-attached storage (NAS). This Virtual Volumes framework allows customers to easily assign and manage storage capabilities on a per-virtual machine basis at the hypervisor level using storage policy-based management. The Virtual Volumes storage architecture represents a significant change in the way hypervisors utilize and interact with storage systems. The VASA virtual machine storage management tool utilizes the unique capabilities of each underlying storage system, as presented through the VASA interface. This VASA interface enables virtual machine administrators and non-storage information technology administrators to have visibility into storage system quality of service features, such as RAID levels and drive type, and to leverage the storage systems data protection features including snapshots. With direct virtual machine to storage device mapping, the Virtual Volumes framework provide fine grain controls for data protection and I/O performance analysis. The storage and data services can be applied on a per virtual machine disk level as opposed to a data store level. The data services provided by storage vendors can be easily leveraged now rather than leveraging the services developed and maintained by virtual machine management tools.

Storage policy-based management enables the capturing of storage service levels requirements such as capacity, performance, availability, and data protection, in the form of logical templates, or policies, to which virtual machines are associated. Storage policy-based management automates storage provisioning by identifying available data stores that meet policy requirements and, when coupled with the Virtual Volumes framework, dynamically instantiates the necessary data services. Through policy enforcement, storage policy-based management also automates service-level monitoring and compliance throughout the lifecycle of a virtual machine.

DETAILED DESCRIPTION

The following example uses the Virtual Volumes framework as the software-defined storage model where virtual machine workloads are running, but the same concept can be extended to any similar storage model that exists. An enterprise may use a storage area network or network-attached storage to satisfy the enterprise's existing virtual machine storage needs, and use traditional backup protection for these virtual machines by implementing backup policies based on schedule, retention, cloning, replication, etc. for these virtual machines in a backup application. The enterprise may determine that the enterprise's storage vendor supports the Virtual Volumes framework, and decide to implement the Virtual Volumes framework. Then the enterprise's storage administrator may create the desired capability profiles in a storage array. The enterprise's virtual machine administrator may create the required virtual machine storage policies via a virtual machine center tool so that the underlying vendor-specific capabilities of the storage array get exposed through the VASA virtual machine storage management tool to the enterprise's virtual machine administrator, and assign the desired storage policies to virtual machines, which enables the virtual machines to seamlessly consume the published capabilities. Then the compliant storage may become available for the virtual machine administrator during provisioning virtual machines to the Virtual Volumes framework, thereby providing the virtual machine administrator with better manageability of the underlying storage resources for any virtual machines running on the Virtual Volumes framework.

Since the enterprise has been running traditional backup protection, the enterprise may prefer to continue using the same workflow for some or all of the virtual machines due to compliance and regulatory reasons and/or due to the requirement of extended retention. For example, an enterprise implements a storage policy for a set of virtual machines based on a daily snapshot copy that is retained for one week, and continues to protect the set of virtual machines through a backup policy based on a daily backup copy that is retained for four weeks. However, the information technology administrator's lack of visibility of the backup copies can result in the creation of an excessive number of copies. Furthermore, this lack of visibility of the backup copies can also result in inefficient handling of copies when a system user requests access to a copy, thereby creating a larger latency.

Embodiments herein enable synchronizing catalogs of virtual machine copies. A system determines the number of copies of a virtual machine in a catalog associated with a virtual machine storage management tool. The system determines the number of copies of the virtual machine in a catalog associated with a backup application. The system creates a copy of the virtual machine, which is associated with the backup application, if the number of copies of the virtual machine in the catalog associated with the virtual machine storage management tool is greater than zero and if the number of copies of the virtual machine in the catalog associated with the backup application is zero.

For example, a synchronizer tool determines the number of copies of virtual machine 3 in a catalog that is exposed by a VASA virtual machine storage management tool. The synchronizer tool determines the number of copies of virtual machine 3 in an Avamar® backup application's catalog. The synchronizer tool prompts the Avamar® backup application to create a copy of virtual machine because the catalog exposed by the VASA virtual machine storage management tool includes a copy of virtual machine 3 and the Avamar® backup application's catalog includes no copy of virtual machine 3.

Figure 1:
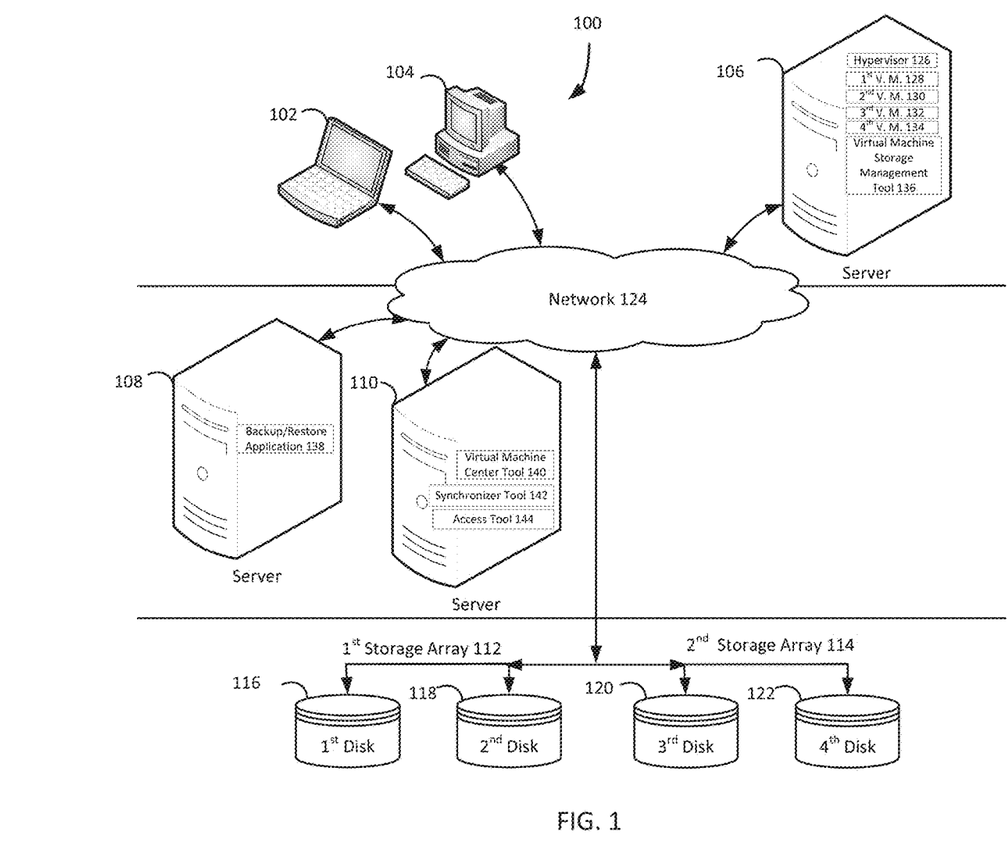
FIG. 1 illustrates a block diagram of an example system for synchronizing catalogs of virtual machine copies, under an embodiment.

FIG. 1 illustrates a diagram of a system for synchronizing catalogs of virtual machine copies, under an embodiment. As shown in FIG. 1, a system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a first server 108, a second server 110, a first storage array 112, and a second storage array 114 that may be provided by a hosting company. Although FIG. 1 depicts the first client 102 as a laptop computer 102, the second client 104 as a personal computer 104, and the third client 106 as a server 106, each of the clients 102-106 may be any type of computer. The first storage array 112 includes a first disk 116 and a second disk 118, and the second storage array 114 includes a third disk 120 and a fourth disk 122. Although examples describe the first storage array 112 storing backups based on backup policies, and the second storage array 114 storing snapshots based on storage policies, one storage array may store both backups based on backup policies and snapshots based on storage policies. The clients 102-106, the servers 108-110, and the storage arrays 112-114 communicate via a network 124. Although FIG. 1 depicts the system 100 with three clients 102-106, two servers 108-110, two storage arrays 112-114, four disks 116-122, and one network 124, the system 100 may include any number of clients 102-106, any number of servers 108-110, any number of storage arrays 112-114, any number of disks 116-122, and any number of networks 124. The clients 102-106 and the servers 108-110 may each be substantially similar to the system 400 depicted in FIG. 4 and described below.

The third client 106 includes a hypervisor 126, which may be a Microsoft Hyper-V® hypervisor. The hypervisor 126 creates and monitors a first virtual machine 128, a second virtual machine 130, a third virtual machine 132, and a fourth virtual machine 134 in the third client 106. The third client 106 also includes a virtual machine storage management tool 136, such as the VASA virtual machine storage management tool 136 that is available from VMware®. Although FIG. 1 depicts the third client 106 as including the hypervisor 126, the first virtual machine 128, the second virtual machine 130, the third virtual machine 132, the fourth virtual machine 134, and the virtual machine storage management tool 136, any of the clients 102-106 or all of the clients 102-106 may include a hypervisor, any number of virtual machines, and a virtual machine storage management tool.

The server 108, which may be referred to as the backup server 108, includes a backup/restore application 138 that creates backup files of the data and the metadata of the clients 102-106, stores the backup files on the first disk 116 and/or the second disk 118, and executes a rollback based on the backup files. The backup/restore application 138 may provide centralized administration, such as scheduling, monitoring, and managing backup operations and backup files. The backup/restore application 138 can enable the storing of backup operation schedules, client policies, and client configurations. The backup/restore application 138 maintains a local database of all processes that execute on the backup server 108. The backup/restore application 138 executes server-side processes for a system administrator's graphical management console, which may enable the system administrator to use command line interface tools for queries. For example, a system administrator identifies the clients 102-106 registered with the backup server 108.

Although FIG. 1 depicts the backup/restore application 138 residing completely on the backup server 108, the backup/restore application 138 may reside in any combination of partially on the backup server 108, partially on the clients 102-106, and/or partially elsewhere. Even though the following paragraphs describe EMC Corporation's Avamar® backup/restore application and EMC Corporation's NetWorker® backup/restore application as examples of the backup/restore application 138, the backup/restore application 138 may be any other backup/restore application which provides the backup/restore functionalities described in the Background section.

The backup/restore application 138 may be an EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems can be deployed in an integrated solution with EMC Corporation's Data Domain® systems for high-speed backup and recovery of specific data types.

The backup/restore application 138 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

The second server 110, which may be referred to as the virtual machine center server 110, includes and executes a virtual machine center tool 140 to provide a centralized and extensible platform for managing virtual infrastructure. This managing of virtual machine environments enables administrators to have simple and automated control over a virtual environment to deliver infrastructure. The virtual machine center server 110 provides centralized management of virtualized hosts and virtual machines from a single console, and gives administrators visibility into the configuration of all the critical components of a virtual infrastructure, all from one place. With the virtual machine center server 110, virtual environments are easier to manage, as a single administrator can manage hundreds of workloads, more than doubling typical productivity in managing physical infrastructure.

The virtual machine center server 110 also includes a synchronizer tool 142 that enables synchronizing catalogs of virtual machine copies, and an access tool 144 that determines access to the virtual machine copies stored in the arrays 112-114. Although FIG. 1 depicts the synchronizer tool 142 residing completely on the virtual machine center server 110, the synchronizer tool 142 may reside in any combination of partially on the virtual machine center server 110, partially on the clients 102-106, and/or partially elsewhere. Similarly, although FIG. 1 depicts the access tool 144 residing completely on the virtual machine center server 110, the access tool 144 may reside in any combination of partially on the virtual machine center server 110, partially on the clients 102-106, and/or partially elsewhere.

After an enterprise's storage administrator creates the desired capability profiles in the $2^{nd}$ storage array 114, the enterprise's virtual machine administrator creates the required virtual machine storage policies via the virtual machine center tool 140 so that the underlying vendor-specific capabilities of the $2^{nd}$ storage array 114 get exposed through the VASA virtual machine storage management tool 134 to the enterprise's virtual machine administrator, who assigns the desired storage policies to virtual machines, which enables the virtual machines to seamlessly consume the published capabilities. The system 100 synchronizes the catalog that is exposed by a virtual machine storage management tool with a catalog which is associated with a backup application by identifying all of the copies of virtual machines that these catalogs have, which enables a synchronization for each copied virtual machine. The system 100 may synchronize catalogs on demand and/or based on a synchronization schedule.

Having identified copy information in catalogs, the system 100 determines the number of copies of a virtual machine in a catalog associated with a virtual machine storage management tool. For example, the synchronizer tool 142 identifies one copy of the $3^{rd}$ virtual machine 132 in the catalog that is exposed by the VASA virtual machine storage management tool 136. Having determined the number of copies of a virtual machine in one catalog, the system 100 determines the number of copies of the same virtual machine in another catalog, which is associated with a backup application. For example, the synchronizer tool 142 identifies no copy of the $3^{rd}$ virtual machine 132 in the Avamar® backup application 138's catalog.

After determining the number of copies of a virtual machine in both catalogs, the system 100 synchronizes the catalogs. If the number of copies of a virtual machine in the catalog associated with a virtual machine storage management tool is greater than zero and if the number of copies of the virtual machine in the catalog associated with a backup application is zero, the system 100 creates a copy of the virtual machine, which is associated with the backup application. For example, the synchronizer tool 142 prompts the Avamar® backup application 138 to create a copy of the $3^{rd}$ virtual machine 132 because the catalog exposed by the VASA virtual machine storage management tool 136 includes a copy of the $3^{rd}$ virtual machine 132 and the Avamar® backup application 138's catalog includes no copy of the $3^{rd}$ virtual machine 132. In this example, the synchronizer tool 142 prompts the Avamar® backup application 138 to create a copy of the $3^{rd}$ virtual machine 132 because the VASA catalog reflects the enterprise's current data protection intent for the $3^{rd}$ virtual machine 132, which was not reflected by the Avamar® backup application 138's catalog. If the number of copies of a virtual machine in the catalog associated with a virtual machine storage management tool is zero and if the number of copies of the virtual machine in the catalog associated with a backup application is greater than zero, the system 100 can delete a copy of the virtual machine, which is associated with the backup application. For example, the synchronizer tool 142 deletes the Avamar® backup application 138's copy of the $3^{rd}$ virtual machine 132 because the catalog exposed by the VASA virtual machine storage management tool 136 includes no copy of the $3^{rd}$ virtual machine 132 and the Avamar® backup application 138's catalog includes a copy of the $3^{rd}$ virtual machine 132. In this example, the synchronizer tool 142 prompts the Avamar® backup application 138 to delete a copy of the $3^{rd}$ virtual machine 132 because the VASA catalog reflects the enterprise's current data protection intent for the $3^{rd}$ virtual machine 132, which was not reflected by the Avamar® backup application 138's catalog.

If the number of copies of a virtual machine in the catalog associated with a virtual machine storage management tool and/or the number of copies of the virtual machine in the catalog associated with a backup application is less than a specified minimum number of copies of the virtual machine, the system 100 can create a copy of the virtual machine. For example, the synchronizer tool 142 prompts the second storage array 114's application programming interface to create a second copy of the $3^{rd}$ virtual machine 132 because the catalog exposed by the VASA virtual machine storage management tool 136 includes one copy of the $3^{rd}$ virtual machine 132 and the minimum number of copies of the $3^{rd}$ virtual machine 132 is two. In another example, the synchronizer tool 142 prompts the Avamar® backup application 138 to create a second copy of the $3^{rd}$ virtual machine 132 because the Avamar® backup application 138's catalog includes one copy of the $3^{rd}$ virtual machine 132 and the minimum number of copies of the $3^{rd}$ virtual machine 132 for the Avamar® backup application 138 is two. In yet another example, the synchronizer tool 142 either prompts the second storage array 114's application programming interface to create its second copy of the $3^{rd}$ virtual machine 132, or prompts the Avamar® backup application 138 to create its second copy of the $3^{rd}$ virtual machine 132 because the catalog exposed by the VASA virtual machine storage management tool 136 includes only one copy of the $3^{rd}$ virtual machine 132, the Avamar® backup application 138's catalog includes only one copy of the $3^{rd}$ virtual machine 132, and the minimum number of combined catalog copies of the $3^{rd}$ virtual machine 132 is three. In addition to and/or as an alternative to creating a required copy of a virtual machine, the system 100 can output a message about creating the required copy of the virtual machine.

If the number of copies of a virtual machine in the catalog associated with a virtual machine storage management tool and/or the number of copies of the virtual machine in the catalog associated with a backup application is greater than a specified maximum number of copies of the virtual machine, the system 100 can output a message about the excessive number of copies of the virtual machine. For example, the synchronizer tool 142 outputs a message indicating that the catalog exposed by the VASA virtual machine storage management tool 136 includes three copies of the $3^{rd}$ virtual machine 132 and the maximum number of copies of the $3^{rd}$ virtual machine 132 is two. In another example, the synchronizer tool 142 outputs a message indicating that the Avamar® backup application 138's catalog includes three copies of the $3^{rd}$ virtual machine 132 and the maximum number of copies of the $3^{rd}$ virtual machine 132 for the Avamar® backup application 138 is two. In yet another example, the synchronizer tool 142 outputs a message indicating that the catalog exposed by the VASA virtual machine storage management tool 136 includes two copies of the $3^{rd}$ virtual machine 132, the Avamar® backup application 138's catalog includes two copies of the $3^{rd}$ virtual machine 132 and the maximum number of copies of the $3^{rd}$ virtual machine 132 for the combined catalogs is three. In addition to and/or as an alternative to outputting a message about the excessive number of copies of a virtual machine, the system 100 can delete an excessive copy of the virtual machine.

Either before, after, or during synchronization of the catalogs, the system 100 can receive a request from a user to access a copy of a virtual machine. For example, the access tool 144 receives a request from the user Joe Smith to access a copy of the $3^{rd}$ virtual machine 132. After receiving a request from a user to access a copy of a virtual machine, the system 100 can determine whether the user is privileged to access a primary copy of the virtual machine, which may be referred to as the golden copy of the virtual machine. A golden copy is the original copy from which subsequent secondary copies are made. For example, the access tool 144 determines whether Joe Smith's administrative user role has been granted the privilege to access the primary copy of the $3^{rd}$ virtual machine 132. If a user is privileged to access a primary copy of a virtual machine, the system 100 can provide the user with access to the primary copy of the virtual machine. For example, the access tool 144 provides the primary copy of the $3^{rd}$ virtual machine 132 to Joe Smith because Joe Smith's administrative user role has been granted the privilege to access the primary copy of the $3^{rd}$ virtual machine 132. If a user is not privileged to access a primary copy of a virtual machine, the system 100 can provide the user with access to a secondary copy of the virtual machine. For example, the access tool 144 creates a secondary copy of the $3^{rd}$ virtual machine 132 based on a primary copy of the $3^{rd}$ virtual machine 132, and provides the secondary copy of the $3^{rd}$ virtual machine 132 to Chris Jones because Chris Jones' test developer role has not been granted the privilege to access the primary copy of the $3^{rd}$ virtual machine 132.

Synchronization of the catalogs of virtual machine copies eliminates the information technology administrator's lack of visibility of the backup copies, thereby result in the deletion of an excessive number of copies and/or the creation of a required number of copies. Furthermore, eliminating this lack of visibility of the backup copies can also result in efficient handling of copies when a system user requests access to a copy, thereby creating a shorter latency.

Figure 2:
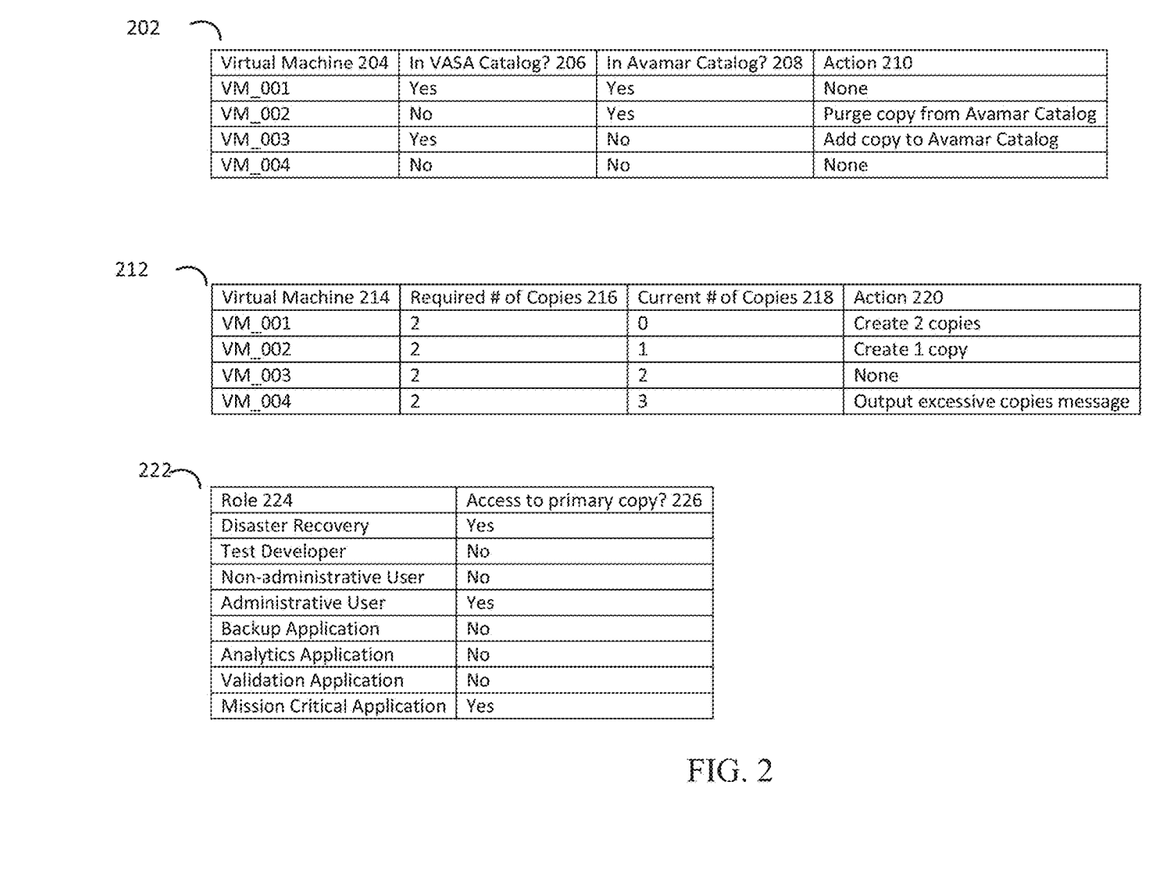
FIG. 2 is a block diagram of example tables for synchronizing catalogs of virtual machine copies, under an embodiment.

FIG. 2 is a block diagram of example tables for synchronizing catalogs of virtual machine copies, under an embodiment. Table 202 depicts which actions the system 100 executes based on various combinations of whether or not a copy of a virtual machine is identified in both catalogs. The virtual machine column 204 lists virtual machines, the "In VASA Catalog" 206 column specifies whether a corresponding virtual machine is in the catalog that is exposed by the VASA virtual machine storage management tool 136, the "In Avamar Catalog?" 208 column specifies whether a corresponding virtual machine is in the Avamar® backup application 138's catalog, and the Action 210 column specifies the action that the system 100 executes based on the synchronization information for the corresponding virtual machine.

Table 212 depicts which actions the system 100 executes based on various comparisons of the required number of copies of a virtual machine against the current number of copies of the virtual machine. The virtual machine column 214 lists virtual machines, the "Required # of Copies" 216 column specifies the number of copies of a corresponding virtual machine that is required by system rules, the "Current # of Copies" 218 column specifies the number of copies of a corresponding virtual machine that are currently stored in one catalog or both catalogs, and the Action 220 column specifies the action that the system 100 executes based on the synchronization information for the corresponding virtual machine.

Table 222 depicts access privileges to primary copies of virtual machines based on various system roles. The Role 224 column identifies various system roles, and the "Access to primary copy?" 226 column specifies whether a corresponding role has been granted the privilege to access a primary copy of a virtual machine.

Figure 3:
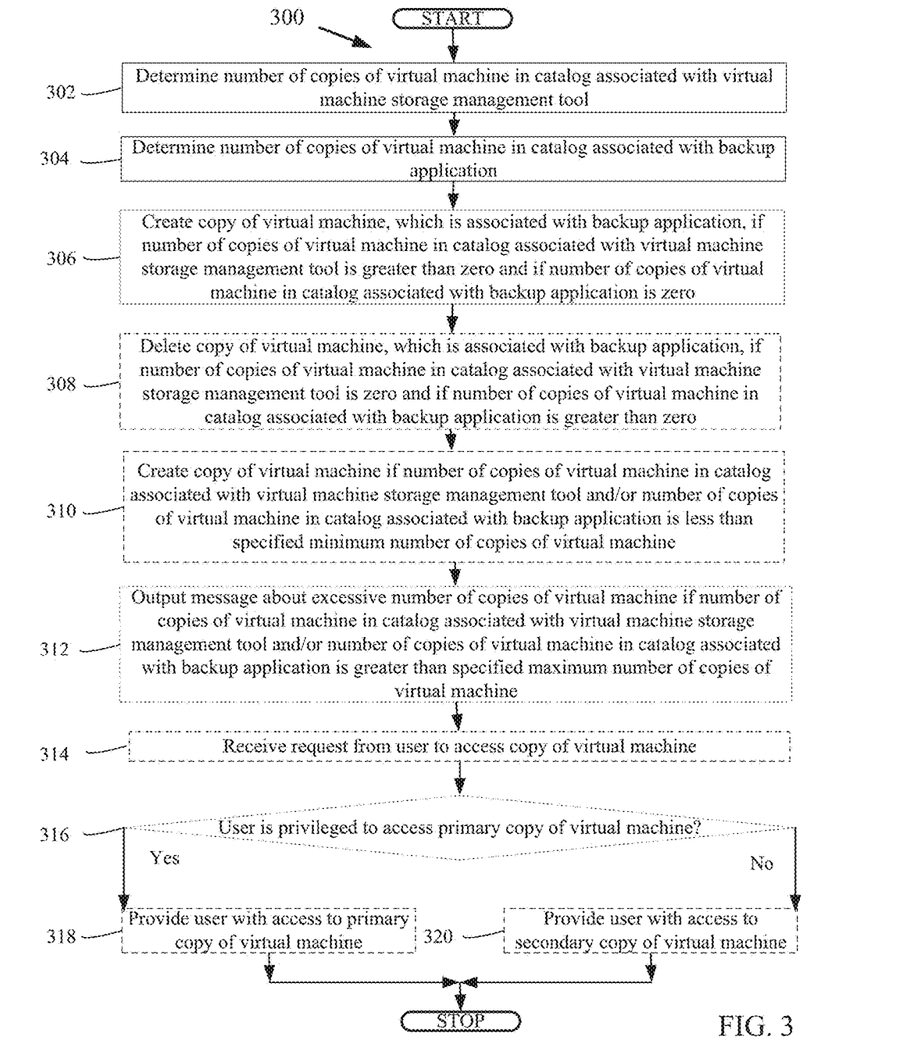
FIG. 3 is a flowchart that illustrates a method of synchronizing catalogs of virtual machine copies, under an embodiment.

FIG. 3 is a flowchart that illustrates a method for synchronizing catalogs of virtual machine copies, under an embodiment. Flowchart 300 illustrates method acts illustrated as flowchart blocks for certain steps involved in and/or between the clients 102-106 and/or the servers 108-110 of FIG. 1.

The system 100 determines the number of copies of a virtual machine in a catalog associated with a virtual machine storage management tool, block 302. For example, the synchronizer tool 142 determines the number of copies of the $3^{rd}$ virtual machine 132 in a catalog that is exposed by the VASA virtual machine storage management tool 136.

Having determined the number of copies of a virtual machine in one catalog, the system 100 determines the number of copies of the same virtual machine in another catalog, which is associated with a backup application, block 304. For example, the synchronizer tool 142 determines the number of copies of the $3^{rd}$ virtual machine 132 in the Avamar® backup application 138's catalog.

After determining the number of copies of a virtual machine in both catalogs, the system 100 creates a copy of the virtual machine, which is associated with a backup application, if the number of copies of the virtual machine in the catalog associated with a virtual machine storage management tool is greater than zero and if the number of copies of the virtual machine in the catalog associated with the backup application is zero, block 306. For example, the synchronizer tool 142 prompts the Avamar® backup application 138 to create a copy of the $3^{rd}$ virtual machine 132 because the catalog exposed by the VASA virtual machine storage management tool 136 includes a copy of the $3^{rd}$ virtual machine 132 and the Avamar® backup application 138's catalog includes no copy of the $3^{rd}$ virtual machine 132.

Having determined the number of copies of a virtual machine in both catalogs, the system 100 optionally deletes a copy of a virtual machine, which is associated with a backup application, if the number of copies of the virtual machine in the catalog associated with a virtual machine storage management tool is zero and if the number of copies of the virtual machine in the catalog associated with the backup application is greater than zero, block 308. For example, the synchronizer tool 142 deletes the Avamar® backup application 138's copy of the $3^{rd}$ virtual machine 132 because the catalog exposed by the VASA virtual machine storage management tool 136 includes no copy of the $3^{rd}$ virtual machine 132 and the Avamar® backup application 138's catalog includes a copy of the $3^{rd}$ virtual machine 132.

After determining the number of copies of a virtual machine in both catalogs, the system 100 optionally creates a copy of a virtual machine if the number of copies of the virtual machine in the catalog associated with a virtual machine storage management tool and/or the number of copies of the virtual machine in the catalog associated with a backup application is less than a specified minimum number of copies of the virtual machine, block 310. For example, the synchronizer tool 142 prompts the second storage array 114's application programming interface to create a second copy of the $3^{rd}$ virtual machine 132 because the catalog exposed by the VASA virtual machine storage management tool 136 includes one copy of the $3^{rd}$ virtual machine 132 and the minimum number of copies of the $3^{rd}$ virtual machine 132 is two.

Having determined the number of copies of a virtual machine in both catalogs, the system 100 optionally outputs a message about an excessive number of copies of a virtual machine if the number of copies of the virtual machine in the catalog associated with a virtual machine storage management tool and/or the number of copies of the virtual machine in the catalog associated with a backup application is greater than a specified maximum number of copies of the virtual machine, block 312. For example, the synchronizer tool 142 outputs a message indicating that the catalog exposed by the VASA virtual machine storage management tool 136 includes three copies of the $3^{rd}$ virtual machine 132 and the maximum number of copies of the $3^{rd}$ virtual machine 132 is two.

Either before, after, or during synchronization of the catalogs, the system 100 optionally receives a request from a user to access a copy of a virtual machine, block 314. For example, the access tool 144 receives a request from the user Joe Smith to access a copy of the $3^{rd}$ virtual machine 132.

After receiving a request from a user to access a copy of a virtual machine, the system 100 optionally determines whether a user is privileged to access a primary copy of a virtual machine, block 316. For example, the access tool 144 determines whether Joe Smith's administrative user role has been granted the privilege to access the primary copy of the $3^{rd}$ virtual machine 132. If a user is privileged to access a primary copy of a virtual machine, the flowchart 300 continues to block 318 to provide the user with access to the primary copy of the virtual machine. If a user is not privileged to access a primary copy of a virtual machine, the flowchart 300 proceeds to block 320 to provide the user with access to a secondary copy of the virtual machine.

If a user is privileged to access a primary copy of a virtual machine, the system 100 optionally provides the user with access to the primary copy of the virtual machine, block 318. For example, the access tool 144 provides the primary copy of the $3^{rd}$ virtual machine 132 to Joe Smith because Joe Smith's administrative user role has been granted the privilege to access the primary copy of the $3^{rd}$ virtual machine 132. Then the flowchart 300 terminates.

If a user is not privileged to access a primary copy of a virtual machine, the system 100 optionally provides the user with access to a secondary copy of the virtual machine, block 320. For example, the access tool 144 provides a secondary copy of the $3^{rd}$ virtual machine 132 to Chris Jones because Chris Jones' test developer role has not been granted the privilege to access the primary copy of the $3^{rd}$ virtual machine 132.

Although FIG. 3 depicts the blocks 302-320 occurring in a specific order, the blocks 302-320 may occur in another order. In other implementations, each of the blocks 302-320 may also be executed in combination with other blocks and/or some blocks may be divided into a different set of blocks.

Figure 4:
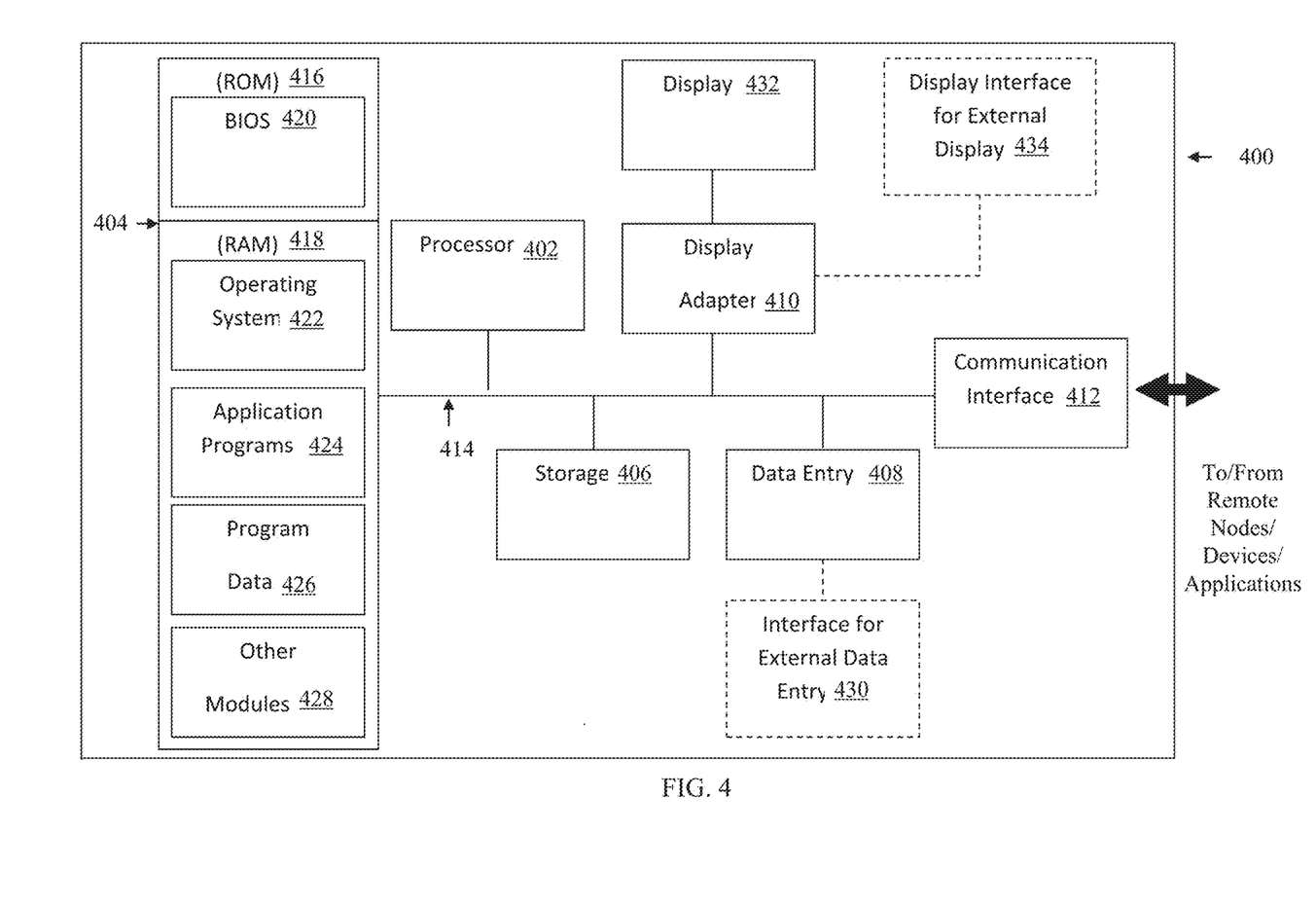
FIG. 4 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 4 may vary depending on the system implementation. With reference to FIG. 4, an exemplary system for implementing the subject matter disclosed herein includes a hardware device 400, including a processing unit 402, memory 404, storage 406, a data entry module 408, a display adapter 410, a communication interface 412, and a bus 414 that couples the elements 404-412 to the processing unit 402.

The bus 414 may comprise any type of bus architecture. Examples include a memory bus, a peripheral bus, a local bus, etc. The processing unit 402 is an instruction execution machine, apparatus, or device and may comprise a microprocessor, a digital signal processor, a graphics processing unit, an application specific integrated circuit (ASIC), a field programmable gate array (FPGA), etc. The processing unit 402 may be configured to execute program instructions stored in the memory 404 and/or the storage 406 and/or received via the data entry module 408.

The memory 404 may include read only memory (ROM) 416 and random access memory (RAM) 418. The memory 404 may be configured to store program instructions and data during operation of the hardware device 400. In various embodiments, the memory 404 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 404 may also include nonvolatile memory technologies such as nonvolatile flash RAM (NVRAM) or ROM. In some embodiments, it is contemplated that the memory 404 may include a combination of technologies such as the foregoing, as well as other technologies not specifically mentioned. When the subject matter is implemented in a computer system, a basic input/output system (BIOS) 420, containing the basic routines that help to transfer information between elements within the computer system, such as during start-up, is stored in the ROM 416.

The storage 406 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 400.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 406, the ROM 416 or the RAM 418, including an operating system 422, one or more applications programs 424, program data 426, and other program modules 428. A user may enter commands and information into the hardware device 400 through the data entry module 408. The data entry module 408 may include mechanisms such as a keyboard, a touch screen, a pointing device, etc. Other external input devices (not shown) are connected to the hardware device 400 via an external data entry interface 430. By way of example and not limitation, external input devices may include a microphone, joystick, game pad, satellite dish, scanner, or the like. In some embodiments, external input devices may include video or audio input devices such as a video camera, a still camera, etc. The data entry module 408 may be configured to receive input from one or more users of the hardware device 400 and to deliver such input to the processing unit 402 and/or the memory 404 via the bus 414.

A display 432 is also connected to the bus 414 via the display adapter 410. The display 432 may be configured to display output of the hardware device 400 to one or more users. In some embodiments, a given device such as a touch screen, for example, may function as both the data entry module 408 and the display 432. External display devices may also be connected to the bus 414 via an external display interface 434. Other peripheral output devices, not shown, such as speakers and printers, may be connected to the hardware device 400.

The hardware device 400 may operate in a networked environment using logical connections to one or more remote nodes (not shown) via the communication interface 412. The remote node may be another computer, a server, a router, a peer device or other common network node, and typically includes many or all of the elements described above relative to the hardware device 400. The communication interface 412 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 412 may include logic configured to support direct memory access (DMA) transfers between the memory 404 and other devices.

In a networked environment, program modules depicted relative to the hardware device 400, or portions thereof, may be stored in a remote storage device, such as, for example, on a server. It will be appreciated that other hardware and/or software to establish a communications link between the hardware device 400 and other devices may be used.

It should be understood that the arrangement of the hardware device 400 illustrated in FIG. 4 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 400.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 4.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for synchronizing catalogs of virtual machine copies, the system comprising:
   one or more processors, and
   a non-transitory storage memory for storing a plurality of instructions which when executed by the one or more processors will cause the one or more processors to:
   determine a number of copies of a virtual machine in a catalog associated with a virtual machine storage management tool;
   determine a number of copies of the virtual machine in a catalog associated with a backup application;
   create a copy of the virtual machine, the copying being associated with the backup application, in response to a determination that the number of copies of the virtual machine in the catalog associated with the virtual machine storage management tool is greater than zero and a determination that the number of copies of the virtual machine in the catalog associated with the backup application is zero; and
   delete a copy of the virtual machine, the copy being associated with the backup application, in response to a determination that the number of copies of the virtual machine in the catalog associated with the virtual machine storage management tool is zero and a determination that the number of copies of the virtual machine in the catalog associated with the backup application is greater than zero.

2. The system of claim 1, wherein the processor-based application further causes the processor to create a copy of the virtual machine in response to a determination that at least one of the number of copies of the virtual machine in the catalog associated with the virtual machine storage management tool and the number of copies of the virtual machine in the catalog associated with the backup application is less than a specified minimum number of copies of the virtual machine.

3. The system of claim 1, wherein the processor-based application further causes the processor to output a message about an excessive number of copies of the virtual machine in response to a determination that at least one of the number of copies of the virtual machine in the catalog associated with the virtual machine storage management tool and the number of copies of the virtual machine in the catalog associated with the backup application is greater than a specified maximum number of copies of the virtual machine.

4. The system of claim 1, wherein the processor-based application further causes the processor to:
   determine whether a user is privileged to access a primary copy of a virtual machine in response to receiving a request from a user to access a copy of the virtual machine; and provide the user with access to a secondary copy of the virtual machine in response to a determination that the user is not privileged to access the primary copy of the virtual machine.

5. The system of claim 4, wherein the processor-based application further causes the processor to provide the user with access to the primary copy of the virtual machine in response to a determination that the user is privileged to access the primary copy of the virtual machine.

6. The system of claim 4, wherein providing the user with access to the secondary copy of the virtual machine comprises creating the secondary copy of the virtual machine based on the primary copy of the virtual machine.

7. A computer-implemented method for synchronizing catalogs of virtual machine copies, the method comprising:
 determining a number of copies of a virtual machine in a catalog associated with a virtual machine storage management tool;
 determining a number of copies of the virtual machine in a catalog associated with a backup application;
 creating a copy of the virtual machine, the copy being associated with the backup application, in response to a determination that the number of copies of the virtual machine in the catalog associated with the virtual machine storage management tool is greater than zero and a determination that the number of copies of the virtual machine in the catalog associated with the backup application is zero; and
 deleting a copy of the virtual machine, the copy being associated with the backup application, in response to a determination that the number of copies of the virtual machine in the catalog associated with the virtual machine storage management tool is zero and a determination that the number of copies of the virtual machine in the catalog associated with the backup application is greater than zero.

8. The method of claim 7, wherein the method further comprises creating a copy of the virtual machine in response to a determination that at least one of the number of copies of the virtual machine in the catalog associated with the virtual machine storage management tool and the number of copies of the virtual machine in the catalog associated with the backup application is less than a specified minimum number of copies of the virtual machine.

9. The method of claim 7, wherein the method further comprises outputting a message about an excessive number of copies of the virtual machine in response to a determination that at least one of the number of copies of the virtual machine in the catalog associated with the virtual machine storage management tool and the number of copies of the virtual machine in the catalog associated with the backup application is greater than a specified maximum number of copies of the virtual machine.

10. The method of claim 7, wherein the method further comprises:
 determining whether a user is privileged to access a primary copy of a virtual machine in response to receiving a request from a user to access a copy of the virtual machine; and
 providing the user with access to a secondary copy of the virtual machine in response to a determination that the user is not privileged to access the primary copy of the virtual machine.

11. The method of claim 10, wherein the method further comprises providing the user with access to the primary copy of the virtual machine in response to a determination that the user is privileged to access the primary copy of the virtual machine.

12. The method of claim 10, wherein providing the user with access to the secondary copy of the virtual machine comprises creating the secondary copy of the virtual machine based on the primary copy of the virtual machine.

13. A computer program product, comprising a non-transitory computer-readable medium having a computer-readable program code embodied therein to be executed by one or more processors, the program code including instructions to:
 determine a number of copies of a virtual machine in a catalog associated with a virtual machine storage management tool;
 determine a number of copies of the virtual machine in a catalog associated with a backup application;
 create a copy of the virtual machine, the copy being associated with the backup application, in response to a determination that the number of copies of the virtual machine in the catalog associated with the virtual machine storage management tool is greater than zero and a determination that the number of copies of the virtual machine in the catalog associated with the backup application is zero; and
 delete a copy of the virtual machine, the copy being associated with the backup application, in response to a determination that the number of copies of the virtual machine in the catalog associated with the virtual machine storage management tool is zero and a determination that the number of copies of the virtual machine in the catalog associated with the backup application is greater than zero.

14. The computer program product of claim 13, wherein the program code includes further instructions to create a copy of the virtual machine in response to a determination that at least one of the number of copies of the virtual machine in the catalog associated with the virtual machine storage management tool and the number of copies of the virtual machine in the catalog associated with the backup application is less than a specified minimum number of copies of the virtual machine.

15. The computer program product of claim 13, wherein the program code includes further instructions to output a message about an excessive number of copies of the virtual machine in response to a determination that at least one of the number of copies of the virtual machine in the catalog associated with the virtual machine storage management tool and the number of copies of the virtual machine in the catalog associated with the backup application is greater than a specified maximum number of copies of the virtual machine.

16. The computer program product of claim 13, wherein the program code includes further instructions to:
 determine whether a user is privileged to access a primary copy of a virtual machine in response to receiving a request from a user to access a copy of the virtual machine;
 provide the user with access to a secondary copy of the virtual machine in response to a determination that the user is not privileged to access the primary copy of the virtual machine; and
 provide the user with access to the primary copy of the virtual machine in response to a determination that the user is privileged to access the primary copy of the virtual machine.

17. The computer program product of claim 13, wherein providing the user with access to the secondary copy of the virtual machine comprises creating the secondary copy of the virtual machine based on the primary copy of the virtual machine.

* * * * *